(12) United States Patent
Arai

(10) Patent No.: US 9,182,960 B2
(45) Date of Patent: Nov. 10, 2015

(54) LOOP DISTRIBUTION DETECTION PROGRAM AND LOOP DISTRIBUTION DETECTION METHOD

(71) Applicant: FUJITSU LIMITED, Kawasaki-shi, Kanagawa (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/603,410

(22) Filed: Jan. 23, 2015

(65) Prior Publication Data
US 2015/0212804 A1 Jul. 30, 2015

(30) Foreign Application Priority Data

Jan. 29, 2014 (JP) ................. 2014-013877

(51) Int. Cl.
G06F 9/44 (2006.01)
G06F 9/45 (2006.01)
G06F 11/36 (2006.01)

(52) U.S. Cl.
CPC ............... *G06F 8/4442* (2013.01); *G06F 8/40* (2013.01); *G06F 11/3688* (2013.01)

(58) Field of Classification Search
CPC ...... G06F 8/4442; G06F 8/40; G06F 11/3688
USPC ......................................................... 717/124
See application file for complete search history.

(56) References Cited

U.S. PATENT DOCUMENTS 5,396,631 A 3/1995 Hayashi et al.
5,805,863 A * 9/1998 Chang ................. G06F 11/3466
714/E11.2

7,840,914 B1 * 11/2010 Agarwal ................. G06F 8/451
716/102

(Continued)

FOREIGN PATENT DOCUMENTS

| JP | 6-250846 | 9/1994 |
|---|---|---|
| JP | 2001-5792 | 1/2001 |
| JP | 2009-104422 | 5/2009 |
| WO | WO98-19249 | 5/1998 |

OTHER PUBLICATIONS

Ikuo Nakano, "Structure of Compiler and Optimization" (second edition), Asakura Publishing Co., Ltd. (2009), pp. 465-470, with English Translation (13 pages).

*Primary Examiner* — Don Wong
*Assistant Examiner* — Theodore Hebert
(74) *Attorney, Agent, or Firm* — Fujitsu Patent Center

(57) ABSTRACT

A loop distribution group detection program for causing a computer to execute a process including, converting a loop distribution target program into a test program having a cache miss measurement instruction, by dividing a loop in the loop distribution target program into plural distribution loops based on a loop distribution specification parameter, sequentially executing the test program while varying the loop distribution specification parameter, extracting loop distribution candidates, for which the number of cache misses exceeds a reference value, as a first loop distribution candidate group, and extracting loop distribution candidates with not exceeding the reference value, as a second loop distribution candidate group, and excluding loop distributions from execution target candidates for the test program, by comparing a loop distribution based on the loop distribution specification parameter with loop distributions of the loop distribution candidates in the first loop distribution candidate group.

9 Claims, 22 Drawing Sheets

(56) References Cited

U.S. PATENT DOCUMENTS

| | | | | |
|---|---|---|---|---|
| 2002/0199178 A1* | 12/2002 | Hobbs | .................. | G06F 8/4442 717/150 |
| 2003/0005419 A1* | 1/2003 | Pieper | .................. | G06F 8/4442 717/141 |
| 2003/0097538 A1* | 5/2003 | Hall | ..................... | G06F 8/4442 711/201 |
| 2005/0246700 A1* | 11/2005 | Archambault | ........ | G06F 8/4442 717/156 |
| 2006/0048120 A1* | 3/2006 | Archambault | ........ | G06F 8/4442 717/160 |
| 2007/0088915 A1* | 4/2007 | Archambault | ........ | G06F 8/4442 711/137 |
| 2009/0113404 A1* | 4/2009 | Takayama | ............... | G06F 8/452 717/149 |
| 2010/0174876 A1* | 7/2010 | Kasahara | ................ | G06F 8/453 711/154 |
| 2013/0166886 A1* | 6/2013 | Sasanka | .............. | G06F 9/30098 712/216 |
| 2015/0106596 A1* | 4/2015 | Vorbach | ................ | G06F 9/3001 712/221 |
| 2015/0212804 A1* | 7/2015 | Arai | ..................... | G06F 8/4442 717/124 |

* cited by examiner

FIG. 5

LOOP DISTRIBUTION TARGET PROGRAM P

| 00 | for (i = St; i < En; i++) { |
|----|------------------------------|
| 01 | S1; |
| 02 | ... |
| 03 | Sn; |
| 04 | } |

FIG. 6

TEMPLATE CODE TL

| 00 | read_loop_group ('LIST OF DISTRIBUTION NUMBER VARIABLE NAMES'); |
| --- | --- |
| 01 | read_max_miss (&MAX_MISS); |
| 02 | start_cache_miss_count(); |
| 03 | for (G = 0; G < 'MAXIMUM VALUE OF NUMBER OF DISTRIBUTIONS'; G++) { |
| 04 |   'CODE IN LOOP BODY' |
| 05 | } |
| 06 |   if (MAX_MISS <= current_cache_miss_count()) { |
| 07 |     not_promising (G); |
| 08 |   } |
| 09 | } |
| 10 | end_cache_miss_count(); |

FIG. 7A
'LIST OF DISTRIBUTION NUMBER VARIABLE NAME'
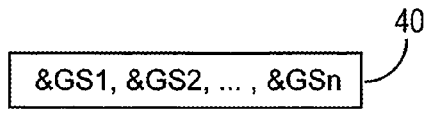
FIG. 7B
'MAXIMUM VALUE OF NUMBER OF DISTRIBUTIONS'
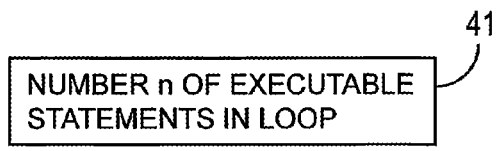
FIG. 7C
'CODE IN LOOP BODY'
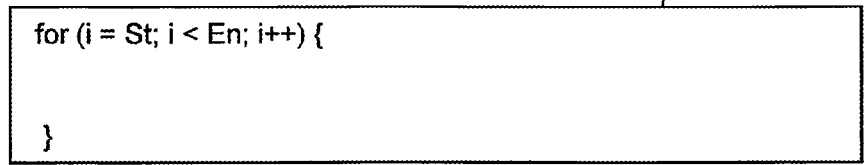
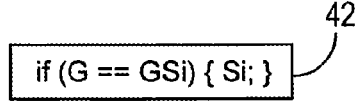
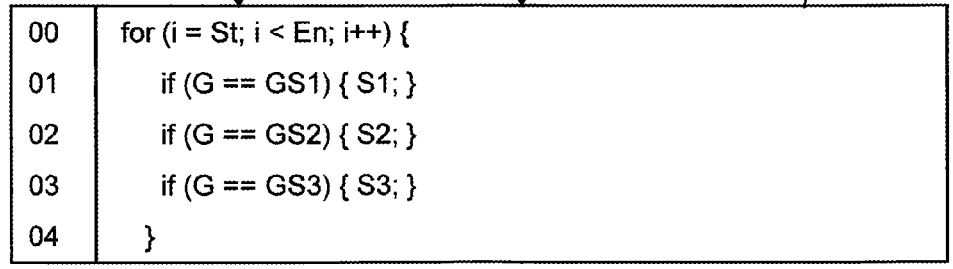

FIG. 8

TEST PROGRAM Q

```
00  read_loop_group ( &GS1, &GS2, &GS3 );
01  read_max_miss (&MAX_MISS);
02  start_cache_miss_count();
03  for (G = 0; G < 3; G++) {
04    for (i = St; i < En; i++) {
05      if (G == GS1) { S1; }
06      if (G == GS2) { S2; }
07      if (G == GS3) { S3; }
08    }
09    if (MAX_MISS <= current_cache_miss_count() {
10      not_promising (G);
11    }
12  }
13  end_cache_miss_count();
```

```
d={0, 0, 1}
&GS1=0, &GS2=0, &GS3=1
for (i = St; i < En; i++) {
  S1
  S2
}
if (MAX_MISS <= current_cache_miss_count()) {
  not_promising (G);
}
for (i = St; i < En; i++) {
  S3
}
if (MAX_MISS <= current_cache_miss_count()) {
  not_promising (G);
}
```

FIG. 11

LOOP DISTRIBUTION TARGET PROGRAM P

| 00 | for (i = 0; i < N; i++) { |
|----|---------------------------|
| 01 | S1; |
| 02 | S2; |
| 03 | S3; |
| 04 | S4; |
| 05 | S5; |
| 06 | S6; |
| 07 | S7; |
| 08 | S8; |
| 09 | S9; |
| 10 | } |

FIG. 12

TEST PROGRAM Q

| 00 | read_loop_group (&GS1, &GS2, &GS3, &GS4, &GS5, &GS6, &GS7, &GS8, &GS9); |
| --- | --- |
| 01 | read_max_miss (&MAX_MISS); |
| 02 | start_cache_miss_count(); |
| 03 | for (G = 0; G < MAXG; G++) { |
| 04 |   for (i = 0; i < N; i++) { |
| 05 |     if (G == GS1) { S1; } |
| 06 |     if (G == GS2) { S2; } |
| 07 |     if (G == GS3) { S3; } |
| 08 |     if (G == GS4) { S4; } |
| 09 |     if (G == GS5) { S5; } |
| 10 |     if (G == GS6) { S6; } |
| 11 |     if (G == GS7) { S7; } |
| 12 |     if (G == GS8) { S8; } |
| 13 |     if (G == GS9) { S9; } |
| 14 |   } |
| 15 |   if (MAX_MISS <= current_cache_miss_count()) { |
| 16 |     not_promising (G); |
| 17 |   } |
| 18 | } |
| 19 | end_cache_miss_count(); |

FIG. 13

TEST PROGRAM Q

| 00 | GS1 = 0; GS2 = 0; GS3 = 0; |
|    | GS4 = 1; GS5 = 1; GS6 = 1; |
|    | GS7 = 2; GS8 = 2; GS9 = 2; |
| 01 | MAX_MISS = 999; |
| 02 | start_cache_miss_count(); |
| 03 | for (G = 0; G < MAXG; G++) { |
| 04 |   for (i = 0; i < N; i++) { |
| 05 |     if (G == GS1) { S1; } |
| 06 |     if (G == GS2) { S2; } |
| 07 |     if (G == GS3) { S3; } |
| 08 |     if (G == GS4) { S4; } |
| 09 |     if (G == GS5) { S5; } |
| 10 |     if (G == GS6) { S6; } |
| 11 |     if (G == GS7) { S7; } |
| 12 |     if (G == GS8) { S8; } |
| 13 |     if (G == GS9) { S9; } |
| 14 |   } |
| 15 |   if (MAX_MISS <= current_cache_miss_count()) { |
| 16 |     not_promising (G); |
| 17 |   } |
| 18 | } |
| 19 | end_cache_miss_count(); |

FIG. 14

TEST PROGRAM Q

| 00 | start_cache_miss_count(); |
|---|---|
| 01 | for (i = 0; i < N; i++) { |
| 02 | S1; |
| 03 | S2; |
| 04 | S3; |
| 05 | } |
| 06 | if (MAX_MISS <= current_cache_miss_count()) { |
| 07 | not_promising (0); |
| 08 | } |
| 09 | for (i = 0; i < N; i++) { |
| 10 | S4; |
| 11 | S5; |
| 12 | S6; |
| 13 | } |
| 14 | if (MAX_MISS <= current_cache_miss_count()) { |
| 15 | not_promising (1); |
| 16 | } |
| 17 | for (i = 0; i < N; i++) { |
| 18 | S7; |
| 19 | S8; |
| 20 | S9; |
| 21 | } |
| 22 | if (MAX_MISS <= current_cache_miss_count()) { |
| 23 | not_promising (2); |
| 24 | } |
| 25 | end_cache_miss_count(); |

FIG. 15

LOOP DISTRIBUTION PROGRAM $P_j$

| 00 | for (i = 0; i < N; i++) { |
|----|---------------------------|
| 01 | S1; |
| 02 | S2; |
| 03 | } |
| 04 | for (i = 0; i < N; i++) { |
| 05 | S3; |
| 06 | S4; |
| 07 | S5; |
| 08 | S6; |
| 09 | } |
| 10 | for (i = 0; i < N; i++) { |
| 11 | S7; |
| 12 | S8; |
| 13 | S9; |
| 14 | } |

FIG. 18

```
for (i = 0; i < N; i++) {
    S1: tmp = A[i] + B[i];
    S2: C[i] = tmp * D[i];
    S3: E[i] = tmp - C[i];
}
```
— 51

```
S1: tmp = ...
S2: ... = ... tmp ...
S3: ... = ... tmp ...
S4: tmp = ... tmp ...
S5: ... = ... tmp ...
```
— 52

```
S1: tmp1 = ...
S2: ... = ... tmp1 ...
S3: ... = ... tmp1 ...
S4: tmp2 = ... tmp1 ...
S5: ... = ... tmp2 ...
```
— 53

FIG. 20

TEST PROGRAM Q'

| 00 | read_loop_group (&GS1, &GS2, &GS3); |
| --- | --- |
| 01 | read_max_miss (&MAX_MISS); |
| 02 | start_cache_miss_count(); |
| 03 | for (G = 0; G < MAXG; G++) { |
| 04 |   for (i = 0; i < N; i++) { |
| 05 |     if (G == GS1) { |
| 06 |       S1; |
| 07 |       if (GS1 != GS2 \|\| GS1 != GS3) { |
| 08 |         TMP[i] = tmp; |
| 09 |       } |
| 10 |     } |
| 11 |     if (G == GS2) { |
| 12 |       if (GS2 != GS1) { |
| 13 |         tmp = TMP[i]; |
| 14 |       } |
| 15 |       S2; |
| 16 |     } |
| 17 |     if (G == GS3) { |
| 18 |       if (GS3 != GS1 && GS3 != GS2) { |
| 19 |         tmp = TMP[i]; |
| 20 |       } |
| 21 |       S3; |
| 22 |     } |
| 23 |   } |
| 24 |   if (MAX_MISS <= current_cache_miss_count()) { |
| 25 |     not_promising (G); |
| 26 |   } |
| 27 | } |
| 28 | end_cache_miss_count(); |

FIG. 21

CASE OF Q' d10 = {0, 0, 1}

| 00 | for (i = 0; i < N; i++) { |
|---|---|
| 01 | S1: tmp = A[i] + B[i]; |
| 02 | TMP[i] = tmp; |
| 03 | S2: C[i] = tmp * D[i]; |
| 04 | } |
| 05 | for (i = 0; i < N; i++) { |
| 06 | tmp = TMP[i]; |
| 07 | S3: E[i] = tmp - C[i]; |
| 08 | } |

CASE OF Q' d11 = {0, 1, 1}

| 00 | for (i = 0; i < N; i++) { |
|---|---|
| 01 | S1: tmp = A[i] + B[i]; |
| 02 | TMP[i] = tmp; |
| 03 | } |
| 04 | for (i = 0; i < N; i++) { |
| 05 | tmp = TMP[i]; |
| 06 | S2: C[i] = tmp * D[i]; |
| 07 | S3: E[i] = tmp - C[i]; |
| 08 | } |

FIG. 22

| d | INTEGERS INCLUDE NO 0 | INTEGERS ARE NOT CONSECUTIVE |
|---|---|---|
| 000 | | |
| 001 | | |
| 002 | | |
| 010 | | |
| 011 | | |
| 012 | | |
| 020 | | X (010) |
| 021 | | |
| 022 | | X (011) |
| 100 | | |
| 101 | | |
| 102 | | |
| 110 | | |
| 111 | X (000) | |
| 112 | X (001) | |
| 120 | | |
| 121 | X (010) | |
| 122 | X (011) | |
| 200 | | X (100) |
| 201 | | |
| 202 | | X (010) |
| 210 | | |
| 211 | X (100) | |
| 212 | X (101) | |
| 220 | | X (110) |
| 221 | X (110) | |
| 222 | X (000) | |

LOOP DISTRIBUTION DETECTION PROGRAM AND LOOP DISTRIBUTION DETECTION METHOD

CROSS-REFERENCE TO RELATED APPLICATION

This application is based upon and claims the benefit of priority of the prior Japanese Patent Application No. 2014-013877, filed on Jan. 29, 2014, the entire contents of which are incorporated herein by reference.

FIELD

The present invention relates to a loop distribution detection program and a loop distribution detection method.

BACKGROUND

Loop distribution is to distribute a loop of a greater size present in an application program into a plurality of loops. For example, high performance computing (HPC) application programs executed by supercomputers have loops of a greater size. Most of the execution time is often spent by such a loop. A loop of a greater size generally has a greater number of cache misses. The reasons are as follows. First, the loop of a greater size has many instructions and thus tends to suffer cache misses in instruction caches. Second, the loop of a greater size often has many variables, and in that case, tends to suffer many cache misses in data caches.

Thus, cache misses and the execution time of the program may be reduced by performing optimum loop distribution on the loop of a greater size. However, the execution of the loop distribution may result in more cache misses than when the loop distribution is not performed.

On the other hand, a compiler has a function to optimize application programs. The optimization is known to include, for example, parallelization of instructions, a single instruction multiple data (SIMD) function to change a plurality of the same instructions into a single instruction, software pipelining in which instructions are reordered so as to be pipelined by a plurality of computing units, and loop unrolling in which a plurality of loops is changed into a single loop to eliminate overhead processing time associated with the plurality of loops.

The optimization enables reduction in the execution time of the program. However, the loop distribution may allow each of the distributed loops to be more appropriately optimized. Furthermore, the optimization enables reduction in program execution time, but the program execution time may further be reduced by optimizing the program with cache misses reduced as a result of the loop distribution.

Thus, the loop distribution only cannot minimize the execution time of the program. Finding the optimization only cannot find a solution for the minimization of the program execution time.

The loop distribution is disclosed in Japanese Patent Application Laid-open No. 2009-104422, WO 98/19249, Japanese Patent Application Laid-open No. H6-250846, Japanese Patent Application Laid-open No. 2001-5792, and Ikuo Nakano, Structure of Compiler and Optimization (second edition), Asakura Publishing Co., Ltd., 2009.

SUMMARY

Thus, it is desired to combine the loop distribution and the program optimization together to allow generation of a program with the minimum program execution time. However, even when a program resulting from the loop distribution has many cache misses, if the distributed loop has a loop shape that is appropriate for a compiler to optimize, the loop distribution may result in higher performance (shorter execution time) than the optimization only.

For detection of the optimum loop distribution, all theoretically possible loop distributions may be compared with one another in terms of performance such as the execution time, and a result with the highest performance may be extracted. However, the total number of theoretically possible loop distributions is enormous, and finding the optimum solution using this best-subset selection procedure is not practical.

One aspect of the present embodiment is non-transitory computer readable storage medium which stores therein a loop distribution group detection program for causing a computer to execute a process comprising:

converting a loop distribution target program into a test program having a cache miss measurement instruction to measure a number of cache misses, by dividing a loop in the loop distribution target program into a plurality of distribution loops based on a loop distribution specification parameter;

sequentially executing the test program while varying the loop distribution specification parameter, extracting loop distribution candidates, for which the number of cache misses measured in accordance with the cache miss measurement instruction exceeds a reference value, as a first loop distribution candidate group, and extracting loop distribution candidates, for which the number of cache misses does not exceed the reference value, as a second loop distribution candidate group; and excluding loop distributions with the number of cache misses exceeding the reference value from execution target candidates for the test program, by comparing a loop distribution based on the loop distribution specification parameter with loop distributions of the loop distribution candidates in the first loop distribution candidate group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram depicting an example of the loop distribution target program P.

FIG. 6 is a diagram depicting an example of the template code TL.

FIGS. 7A to 7C are diagrams illustrating compilation of the template code TL.

FIG. 8 is a diagram depicting the test program Q resulting from a source code conversion of the loop distribution target program P performed by the loop code translator T.

FIG. 11 is a diagram depicting a sample program of the loop distribution target program P.

FIG. 12 is a test program Q resulting from a source code conversion of the loop distribution target program P in FIG. 11 which is performed by the computer by executing the source code translator T.

FIG. 13 is a diagram depicting the test program Q provided with d={0, 0, 0, 1, 1, 1, 2, 2, 2} and MAX_MISS=999.

FIG. 14 is a diagram depicting a test program Q that is substantially the same as the test program Q in FIG. 13.

FIG. 15 is a diagram depicting an example of the loop distribution program $P_j$.

FIG. 18 is a diagram illustrating Variation 2.

FIG. 20 and FIG. 21 are diagrams depicting an example of a test program with a temporary array added thereto.

FIG. 22 is a diagram depicting an example of a loop distribution specification parameter d determined not to be worthwhile to be tested.

DESCRIPTION OF EMBODIMENTS

Figure 1:
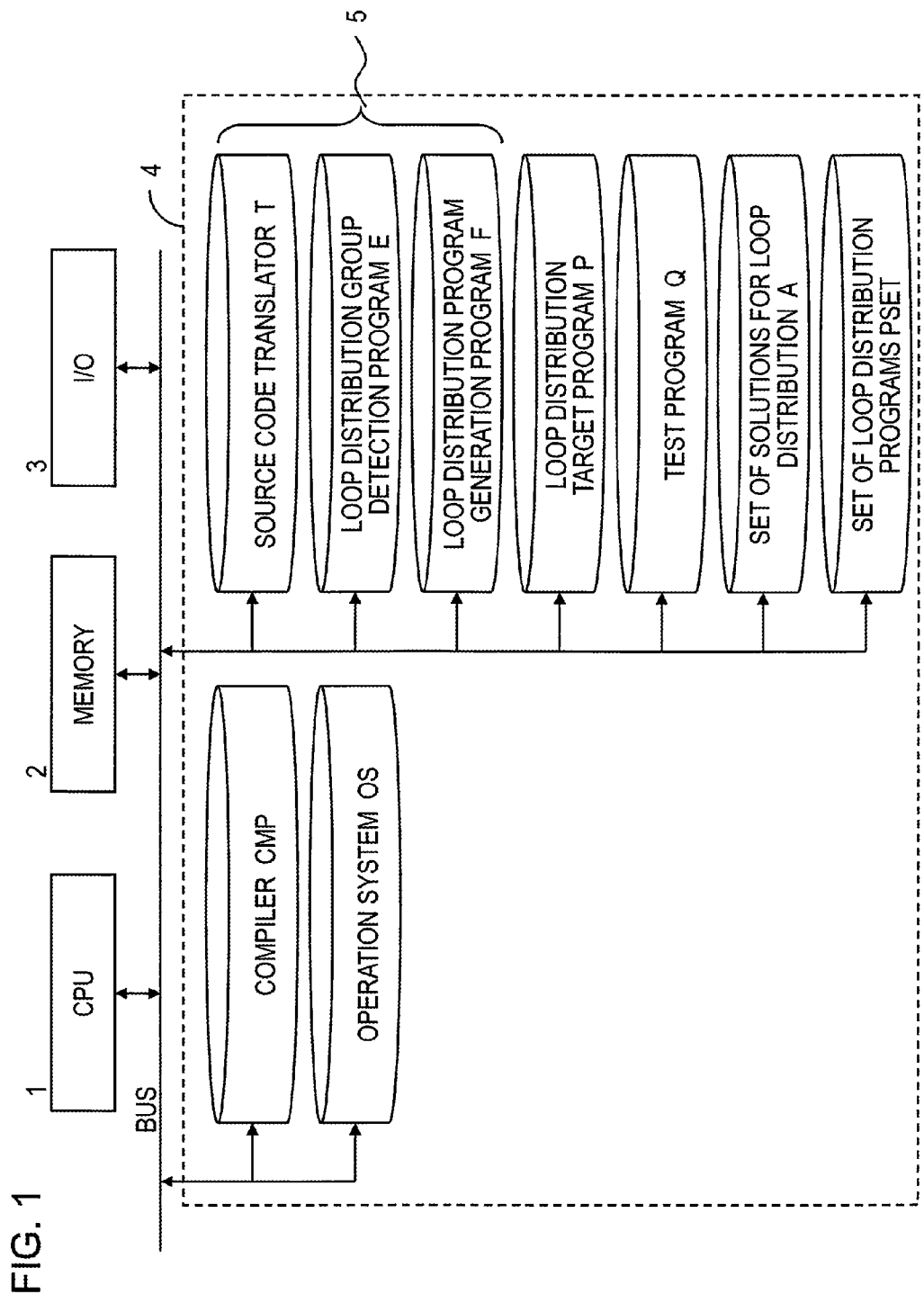
FIG. 1 is a diagram of a configuration of an information processing apparatus that executes a loop distribution detection method according to an embodiment.

FIG. 1 is a diagram of a configuration of an information processing apparatus that executes a loop distribution detection method according to an embodiment. The information processing apparatus (computer) depicted in FIG. 1 has a CPU 1, a main memory 2 such as DRAM, an I/O apparatus 3, a mass storage apparatus 4 such as a hard disk, and a bus BUS that connects the CPU 1, the main memory 2, the I/O apparatus 3, and the mass storage apparatus 4 together.

The storage apparatus 4 stores an operating system OS and a compiler CMP which optimizes programs and which converts source code into object code. Moreover, the storage apparatus 4 stores a loop distribution program 5 that causes a computer to execute a loop distribution process according to the embodiment.

The loop distribution program 5 has a source code translator T that performs a source code conversion of a loop distribution target program P into a test program Q, a loop distribution group detection program E that executes the test program Q to output a set A of solutions for loop distribution, and a loop distribution program generation program F that generates a set PSET of loop distribution programs resulting from loop distribution based on the solutions for loop distribution.

The operating system OS, the compiler CMP, the group of programs T, E, F, P, Q, and PSET in the storage apparatus 4 are expanded into the memory 2 and the CPU 1 of the computer executes the operating system OS, the compiler CMP, and the programs T, E, F, P, Q, and PSET in the main memory 2.

Figure 2:
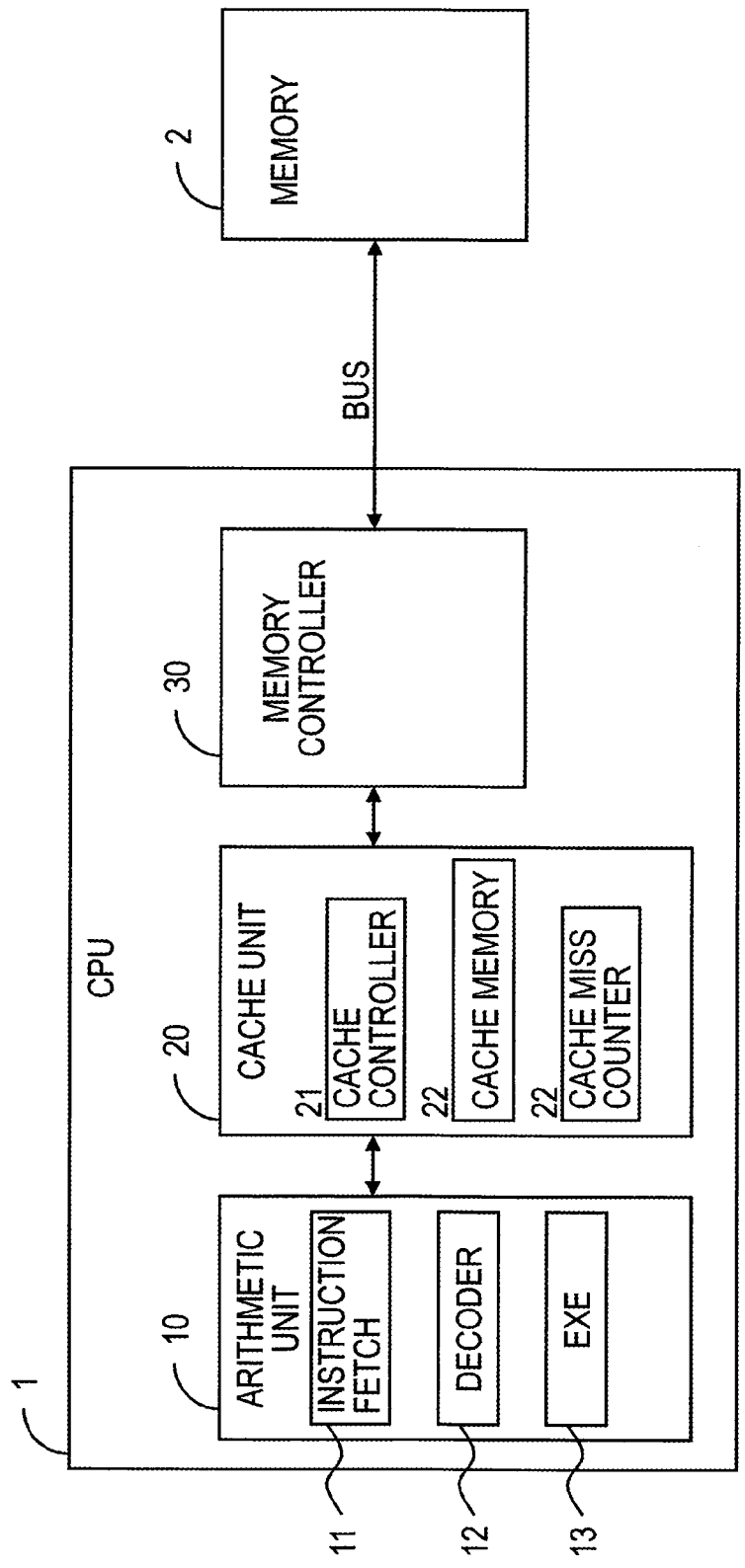
FIG. 2 is a diagram showing a general configuration of the CPU 1 of the computer in FIG. 1.

FIG. 2 is a diagram showing a general configuration of the CPU 1 of the computer in FIG. 1. The CPU 1 has an arithmetic unit 10, a cache unit 20, and a memory controller 30. The arithmetic unit 10 has an instruction fetch 11 that fetches an instruction in a program, which is being executed, from the memory 2, a decoder 12 that decodes the fetched instruction, and a calculation unit 13 that performs a calculation in accordance with the decode result. The cache unit 20 has a high-speed cache memory 22 that temporarily stores data from the main memory 2, a cache controller 21 which determines whether or not access target data is present in the cache memory 22, in response to a memory access from the arithmetic unit 10, and which writes the accessed data to the cache memory 22, while writing out infrequently accessed data in the cache memory to the main memory 2, and a cache miss counter 22 that counts up each time a cache miss occurs. Cache miss measurement instructions, for example, an instruction to cause the cache miss counter 22 to start counting, an instruction to cause the cache miss counter 22 to end counting, and an instruction to read a count value are registered in a library of the CPU.

[Summary of the Loop Distribution Process]

Figure 3:
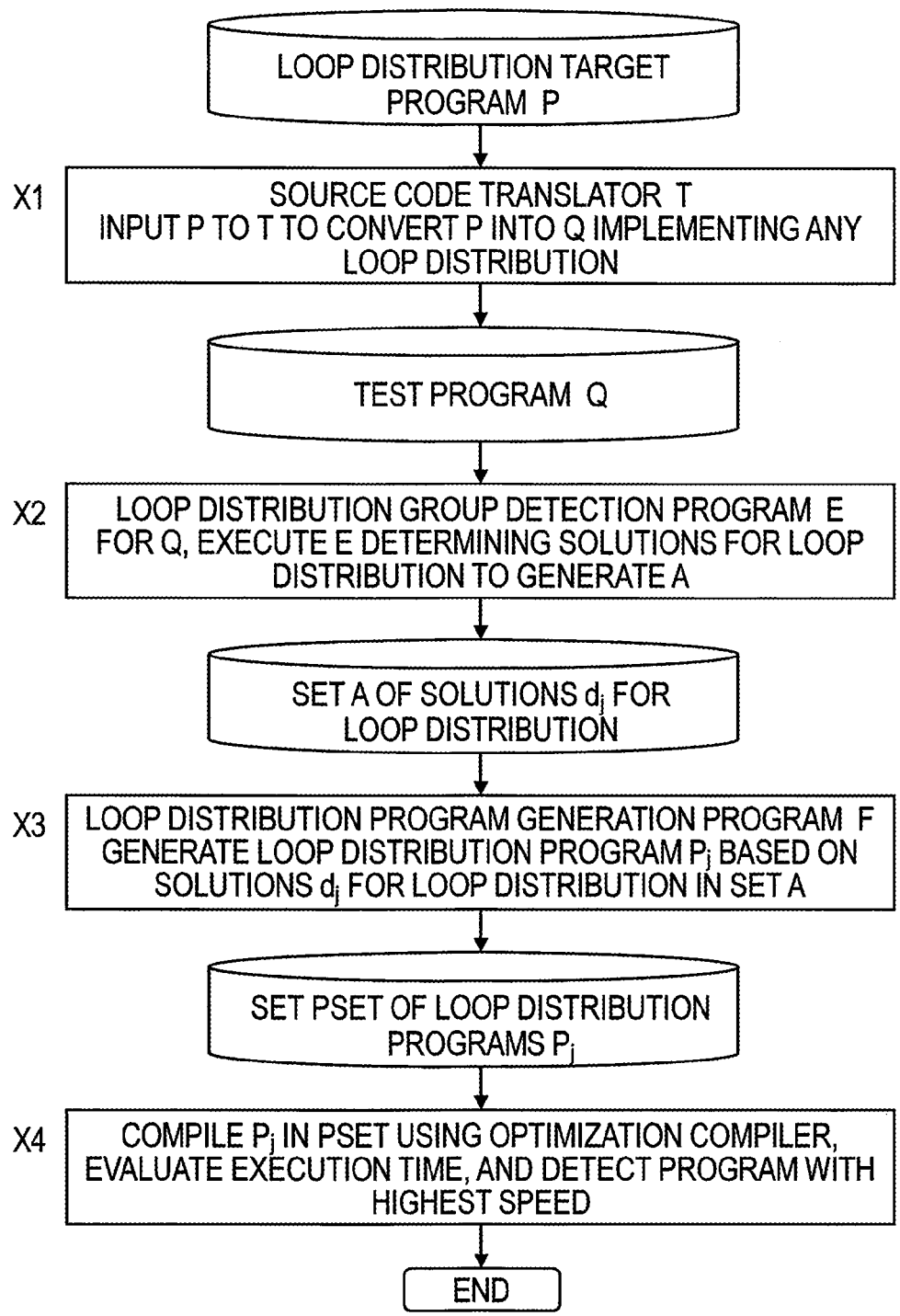
FIG. 3 is a flowchart of a loop distribution process carried out by the computer by executing the loop distribution program 5.

FIG. 3 is a flowchart of a loop distribution process carried out by the computer by executing the loop distribution program 5. The loop distribution process according to the embodiment will be described below in brief in accordance with the flowchart.

The loop distribution target program P is, for example, an HPC application program with loops of a relatively greater size. The computer executes the loop distribution program 5 to input the loop distribution target program P and output the set PSET of loop distribution programs in which internal loops in the program P are distributed into a plurality of distribution loops.

The computer executes the source code translator T to perform a source code conversion of the loop distribution target program P into the test program Q (X1). The test program Q has a plurality of distribution loops resulting from loop distribution of the loop in the loop distribution target program P based on a loop distribution specification parameter. The test program Q further has the cache miss measurement instructions to measure the number of cache misses occurring when the computer executes the test program Q. The cache miss measurement instructions are registered in the library of the CPU as described above.

The computer executes the loop distribution group detection program E to sequentially execute the test program Q with the loop distribution specification parameter varied. The computer thus extracts, as a first loop distribution candidate group, loop distribution candidates for which the number of cache misses measured in accordance with the cache miss measurement instructions exceeds a reference value, and as a second loop distribution candidate group, loop distribution candidates for which the number of cache misses does not exceed the reference value (X2). A set of top N loop distribution candidates in the second loop distribution candidate group which have fewer cache misses is a set A of solutions $d_j$ for loop distribution.

The computer executes the loop distribution program generation program F to generate a loop distribution program $P_j$ based on the solutions $d_j$ for loop distribution in the set A, thus generating a set PSET of loop distribution programs $P_j$ (X3). The set PSET of loop distribution programs $P_j$ is a set of N (N is a plural number) programs resulting from loop distribution and having fewer cache misses. Thus, the loop distribution process is complete.

Then, in the embodiment, the computer executes the optimization compiler CMP to optimize and compile the N loop distribution programs $P_j$ in the set PSET. The computer then executes compiled object code and measures the execution time to detect a loop distribution program with the highest speed (X4).

[Details of the Loop Distribution Process]

[Process X1 Executed by the Source Code Translator T]

Figure 4:
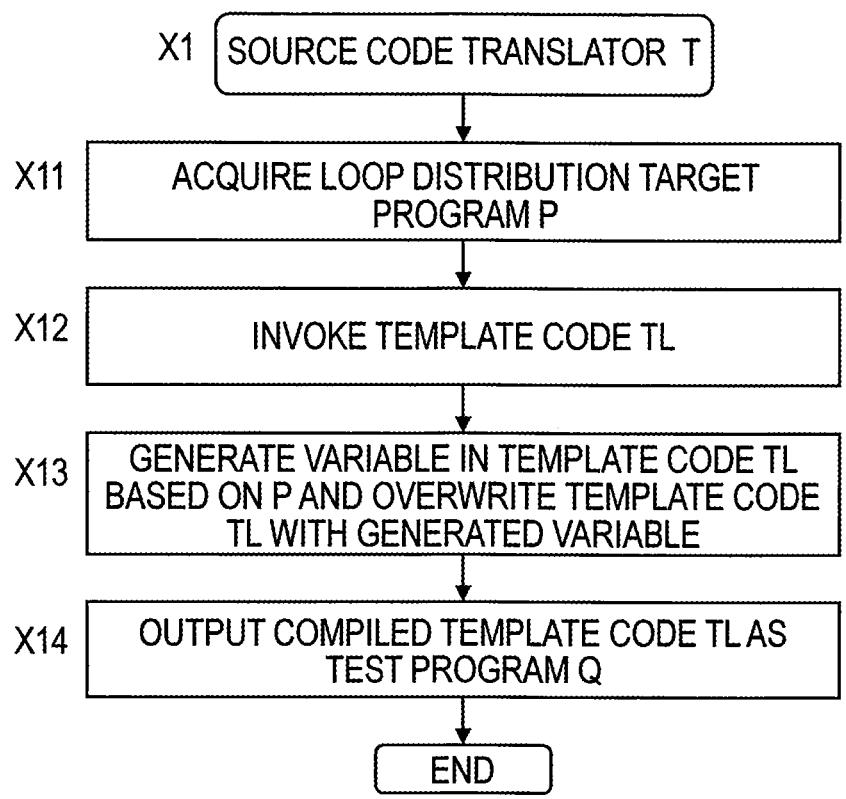
FIG. 4 is a flowchart of a process in which the computer executes the source code translator T.

FIG. 4 is a flowchart of a process in which the computer executes the source code translator T. The computer executes the source code translator T to carry out the process depicted in FIG. 4. First, the computer executes the source code translator T to input the loop distribution target program P (X11). The computer then executes the source code translator T to invoke template code TL on which the test program is based (X12). The computer executes the source code translator T to generate variables in the template code TL on the basis of the loop distribution target program P, overwrite the variables to the template code TL to compile the template code TL (X13). The computer then executes source code translator T to output the compiled template code TL as the test program Q (X14). Thus, a source code conversion is performed on the loop distribution target program P to obtain the test program Q. Steps X11, X12, and X13 will be described below.

FIG. 5 is a diagram depicting an example of the loop distribution target program P. The loop distribution target program P has n executable statements S1 to Sn in a loop of a "for" statement. The loop of "for" statement is a loop distribution target.

FIG. 6 is a diagram depicting an example of the template code TL. FIGS. 7A to 7C are diagrams illustrating compilation of the template code TL.

A function 'read_loop_group ('LIST OF DISTRIBUTION NUMBER VARIABLE NAMES')' in line 00 in the template code TL is a function statement which reads in a given loop distribution specification parameter d (not shown) and which sets each of the distribution number variables to the distribution number of each of the executable statements S. The translator T generates lists of distribution number variable names at the number equivalent to the number of the executable statements in the loop distribution target loop.

When n executable statements are present as in FIG. 5, the list of distribution number variable names is as follows, as depicted in a list 40 in FIG. 7A.

&GS1, &GS2, . . . &GSn

The distribution number variable of the distribution loop to which the executable statement S1 belongs is denoted by &GS1. The distribution number variable of the distribution loop to which the executable statement S2 belongs is denoted by &GS2. The distribution number variable of the distribution loop to which the executable statement Sn belongs is denoted by &GSn. The loop distribution specification parameter d will be described below.

A function 'read_max_miss (&MAX_MISS)' in line 01 is a function statement that reads the maximum value MAX_MISS of the number of cache misses. The maximum value MAX_MISS of the number of cache misses is the number of cache misses of the loop distribution candidate with the greatest number of cache misses among top N loop distribution candidates, the top N loop distribution candidates having fewer cache misses included in the second loop distribution candidate group that is the set A of the solutions $d_j$ for loop distribution. The maximum value MAX_MISS is the reference value of the number of cache misses that allows distinction between the first loop distribution candidate group and the second loop distribution candidate group.

A function 'start_cache_miss_count( )' in line 02 is a function that starts a process of counting cache misses. A function 'end_cache_miss_count ( )' in line 10 is a function which ends counting cache misses and outputs the number of cache misses to terminate the program.

The 'MAXIMUM VALUE OF THE NUMBER OF DISTRIBUTIONS' in line 03 is the number n of the executable statements S in the distribution target loop. This is as depicted by the maximum value of the number of distributions 41 in FIG. 7B. In other words, in the example in FIG. 5, the distribution target loop contains n executable statements S, and when the distribution target loop is distributed into n loops each with one of the executable statements S, the number of distributions has the maximum value n.

A 'CODE IN LOOP BODY' in line 04 is generated as depicted in FIG. 7C. First, the translator T utilizes as an outer loop 44 loop code in lines 00 and 04, which are the code of the loop in a loop distribution target depicted in FIG. 5, without any modification. The inside of the loop is created as follows. That is, for each executable statement Si, the translator T creates the following code as depicted by code 42 in FIG. 7C.

if (G==GSi) {Si;}

The code means that the executable statement Si is executed when a variable G varying from 0 to the maximum value n of the number of distributions is equal to the distribution number variable GSi of the executable statement Si. Thus, each executable statement Si is executed in the distribution loop with the distribution number to which the executable statement Si belongs.

Code 43 in the compiled loop body depicted in FIG. 7C is an example in which the maximum value n of the number of distributions is 3. Each of the executable statements S1, S2, and S3 is converted into code if (G==GSi) {Si;}.

When the number of cache misses is equal to or greater than (or exceeds) the maximum value MAX_MISS, a function 'not_promising (G)' in line 07 executes a process of outputting to a file the distribution number G of the loop, which is being executed, then terminating the program.

FIG. 8 is a diagram depicting the test program Q resulting from a source code conversion of the loop distribution target program P performed by the loop code translator T. In the example in FIG. 8, the loop of the loop distribution target program contains three executable statements Si (n=3). Operations of the test program Q will be generally described below.

First, when the test program Q is provided with a variable d (loop distribution specification parameter d) representing a candidate for loop distribution specification and the maximum value MAX_MISS and then executed, the plurality of executable statements Si is distributed based on the variable d and then executed. The loop distribution specification parameter d is, for example, d={0, 0, 1}, which specifies loop distribution in which the executable statements S1 and S2 are contained in the distribution loop with the distribution number 0 and in which the executable statement S3 is contained in the distribution loop with the distribution number 1. In other words, the loop distribution specification parameter d specifies distribution numbers of distribution loop to which the executable statements Si in the distribution target loop belong to.

Then, the function 'read_loop_group (&GS1, &GS2, &GS3)' in line 00 sets the loop distribution specification parameter d={0, 0, 1} to the distribution number variables GS1, GS2, and GS3. Moreover, the function 'read_max_miss (&MAX_MISS)' in line 01 sets the maximum value parameter MAX_MISS to the maximum value variable MAX_MISS.

Furthermore, the computer executes the test program Q to carry out a process of starting counting based on a cache miss counter using the function 'start_cache_miss_count( )' in line 02.

Then, as depicted in FIG. 8, the code between line 03 and line 12 at left side is distributed into (1) a loop involving a loop of the executable statements S1 and S2 and code in lines 09 to 11 that executes the function 'not_promising(G)' when the number of cache misses is equal to or greater than (or exceeds) the maximum value MAX_MISS, and (2) a loop involving a loop of the executable statement S3 and code between line 09 and line 11 as shown at right side, and such distributed loops are executed.

Thus, the computer executes the test program Q to distribute the executable statements Si in the loop into a single distribution loop or a plurality of distribution loops based on the loop distribution specification parameter d and execute the loops. Then, each time each distribution loop ends, the computer determines whether or not the number of cache misses is equal to or greater than the maximum value MAX_MISS. When the number of cache misses is equal to or greater than (or exceeds) the maximum value MAX_MISS, the computer outputs the current distribution number G and terminates the test program Q. When the number of cache misses is less than (or does not exceed) the maximum value MAX_MISS, the computer executes the next distribution loop. Then, when the distribution loops are executed up to the final distribution loop with the number of cache misses still lower than the maximum value, the computer outputs the number of cache misses and terminates the test program Q.

[Process X2 Executed by the Loop Distribution Group Detection Program E]

Now, a process X2 will be described in which the computer executes the loop distribution group detection program E to sequentially execute the test program Q with the loop distribution specification parameter d varied, thus efficiently extracting N loop distribution candidates in order of fewer cache misses.

Figure 9:
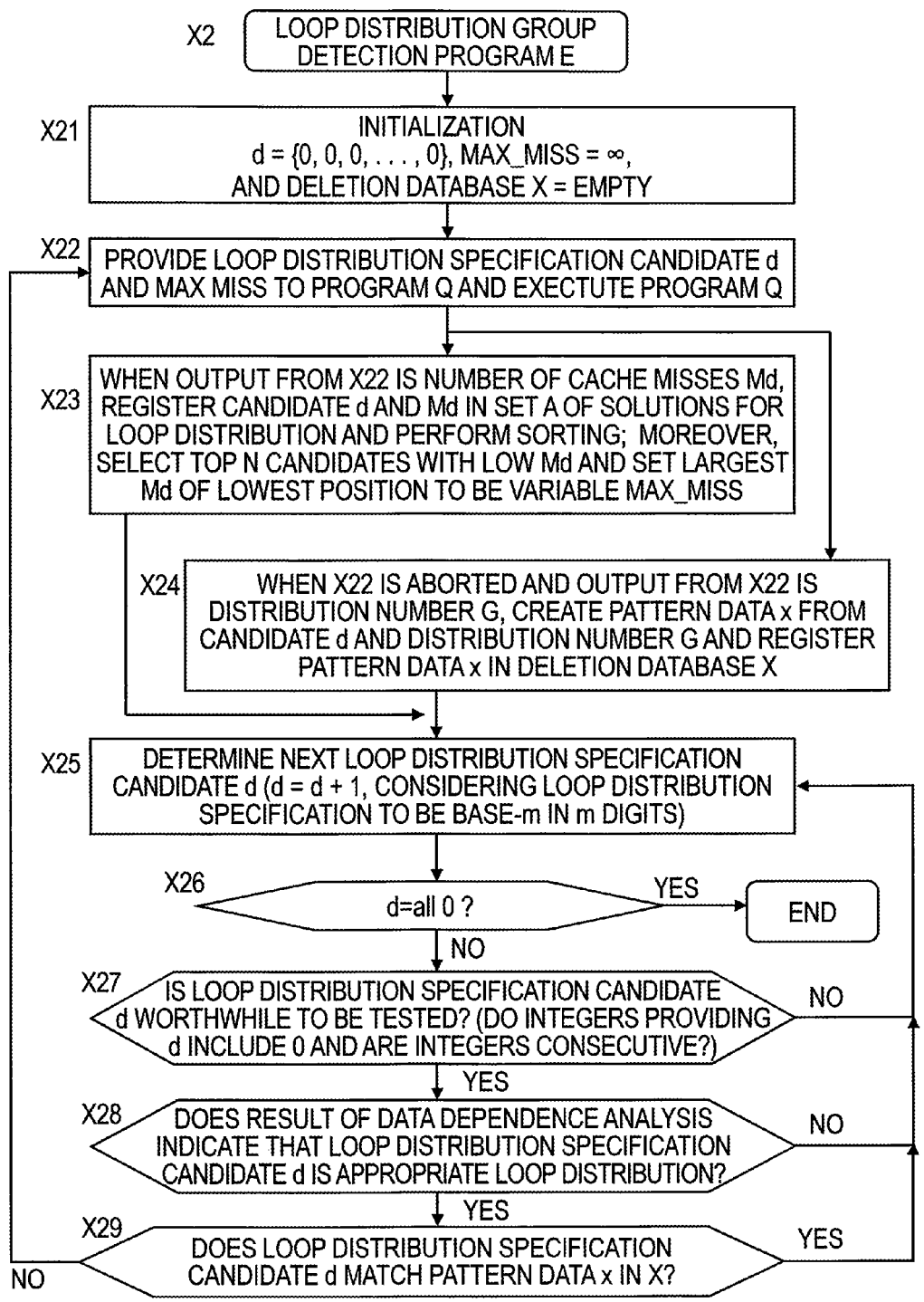
FIG. 9 is a flowchart of a process in which the computer executes the loop distribution group detection program E.

FIG. 9 is a flowchart of a process in which the computer executes the loop distribution group detection program E. First, the computer executes the program E to initialize the loop distribution specification parameter d to d={0, 0, 0, . . . 0}, the maximum value MAX_MISS of the number of cache misses to infinity (∞), and a deletion database X to empty (X21). Then, the computer executes the program E to provide the loop distribution specification parameter d to the test program Q and execute the test program Q (X22).

When providing the loop distribution specification parameter d and the maximum value MAX_MISS to the program Q and executing the program Q, the computer executes, for each of the distribution numbers of the distribution loops indicated by the loop distribution specification parameter d, one or more executable statements Si in the distribution loop (lines 04 to 08), and when the number of cache misses is equal to or greater than (or exceeds) the maximum value MAX_MISS, then, the current distribution number G is output (lines 09 to 11), or the execution of the executable statements Si in all the distribution loops is completed, and the number of cache misses Md is output (line 13), as depicted in the test program Q in FIG. 8.

Thus, when the output of the result of execution of the test program Q in the process X22 involved in the execution of the program E is the value of the number of cache misses Md, this means that the execution of all the executable statements Si is complete and that the number of cache misses is lower than the maximum value MAX_MISS. Thus, the computer registers candidate loop distribution specification parameters d and the number of cache misses Md in the set A of solutions for loop distribution, and sorts the candidates in order of increasing number of cache misses (X23). The computer then selects the top N candidates with fewer cache misses Md from the set A of solutions for loop distribution and deletes the remaining candidates. The computer sets the number of cache misses Md of the last rank candidate in the left N candidates (maximum Md) to be the maximum value MAX_MISS (X23).

On the other hand, when the output of the process X22 involved in the execution of the program E is the distribution number G, this means that not all the executable statements Si have been executed and that the number of cache misses is equal to or greater than the maximum value MAX_MISS when the Gth distribution loop is completed. The computer thus creates pattern data x from loop distribution candidates d and the distribution number G and registers the pattern data x in the deletion database X (X24). A method for creating the pattern data x will be described below.

The computer executes the program E to determine the next loop distribution specification parameter d after the process X23 or X24 (X25). Specifically, the computer increases d by 1, as viewing the loop distribution specification parameter d to be a base-m number in m digits. For example, when the loop distribution specification parameter d is:
{0, 1, 2},
the computer considers the loop distribution specification parameter to be a ternary number in three digits and increases d by 1. The updated d is:
{0, 2, 0}.

If the loop distribution specification parameters d becomes all zero, this means that the candidates for loop distribution have all been tested. The computer then terminates the program E (YES in X26).

Then, the computer executes the program E to check whether or not a candidate based on the next loop distribution specification parameter d is worthwhile to be tested by the processes X22, X23, and X24 (X27, X28, and X29).

In the first check X27 of whether or not the candidate is worthwhile to be tested, the computer determines whether or not integers in the loop distribution specification parameter d include 0 and are consecutive. When the determination result is YES, the loop distribution candidate is worthwhile to be tested. The computer then proceeds to the next check process X27. When the determination result is NO, the loop distribution candidate is the same as an already tested loop distribution. The computer then proceeds to the process X25 to generate a next loop distribution specification parameter d.

FIG. 22 is a diagram depicting an example of a loop distribution specification parameter d determined not to be worthwhile to be tested. In the example, the loop distribution specification parameter d is a ternary number in three digits. In FIG. 22, loop distribution specification parameters d with no 0 and loop distribution specification parameters d each including inconsecutive integers are denoted by X, and duplicate examples are depicted.

For example, d1={1, 2, 2} and d2={0, 1, 1} represent the same loop distribution, and thus, d1={1, 2, 2} not including 0 is not worthwhile to be tested. Furthermore, d3={0, 2, 2} and d4={0, 1, 1} represent the same loop distribution, and thus, d3={0, 2, 2} which includes inconsecutive integers is not worthwhile to be tested. Thus, when the result of the first check X27 indicates that the integers in the loop distribution specification parameter d include 0 and are consecutive, the computer determines the loop distribution specification parameter d to be worthwhile to be tested and proceeds to the process X28. When the integers include no 0 or are inconsecutive, the computer considers the loop distribution specification parameter d not to be worthwhile to be tested and proceeds to the process X25.

In the second check X28 of whether or not the loop distribution specification parameter d is worthwhile to be tested, the computer performs a data dependence analysis on the test program Q loop-distributed based on the loop distribution specification parameter d to determine whether or not the loop distribution is appropriate. The data dependence analysis is an analysis involving checking whether or not the execution order in the test program Q has caused the logic of the original loop distribution target program P to be corrupted. When the corruption is caused in the logic, the computer determines the loop distribution performed on the test program Q to be inappropriate. Upon determining the loop distribution to be inappropriate, the computer proceeds to the process X25 and upon determining the loop distribution to be appropriate, the computer proceeds to the process X29. An example of the cause of the corruption of the logic of the original loop distribution target program P may be a case where a logic in which a variable is utilized after defining the variable is reversed, such as a statement utilizing the variable is executed before executing a statement defining the variable.

In the third check X29 of whether or not the loop distribution specification parameter d is worthwhile to be tested, the computer determines whether or not the loop distribution specification parameter d matches the pattern data x in the deletion database X. This determination process involves, as described later, determining whether the current loop distribution specification parameter d generates the same result as a loop distribution candidate that has been aborted because the number of cache misses has become equal to or greater than the maximum value MAX_MISS. Upon determining that the current loop distribution specification parameter d generates the same result as the loop distribution candidate (YES in X29), the computer determines that the loop distribution specification parameter d is not worthwhile to be tested and proceeds to the process X25. Upon determine that the current loop distribution specification parameter d generates the same result as the loop distribution candidate (NO in X29), the computer determines that the loop distribution specification parameter d is worthwhile to be tested and proceeds to the process X22 to execute the test program Q using the loop distribution specification parameter d.

[Process of Generating Pattern Data x During the Process X24 and Determination Process During Process X29]

The process of generating pattern data x during the process X24 is as described below. For the loop distribution candidate d, when the number of cache misses becomes equal to or greater than the maximum value MAX_MISS while the test program Q is in execution, the distribution number G is output. Then, the numbers equal to or lower than the distribution number G are selected from the loop distribution specification parameter d and the numbers greater than the distribution number G are converted into a symbols ? (? is a wildcard). For example, when the d and G are as follows:
d={0, 0, 1, 1, 2, 2} and
G=1,
the pattern data x is as follows:
x={0, 0, 1, 1, ?, ?}.

The symbol ? denotes an integer greater than the distribution number G.

The process of determining whether or not the loop distribution specification parameter d during the process X29 matches the pattern data x in the deletion database X is as described below. In the process X29, the computer determines whether or not the integers in the pattern data x other than ? are the same as the numbers in the loop distribution specification parameter d to be determined. When not all the integers are the same as the numbers, the computer determines that the candidate d does not match the pattern data x. When all the integers are determined to be the same as the numbers, the computer further checks the integers in the ? portions of the candidate d. That is, when all the integers in the ? portions of the candidate d are greater than the maximum value included in the pattern data x, the computer determines that the candidate d matches the pattern data x. When at least one of the integers in the ? portions of the candidate d is equal to or lower than the maximum value included in the pattern data x, the computer determines that the candidate d fails to match the pattern data x.

For example, for the pattern data x={0, 0, 1, 1, ?, ?}, examples of matched candidates d and mismatched candidates d are as follows.

Examples of Matched Candidates
d5={0, 0, 1, 1, 2, 2}
d6={0, 0, 1, 1, 2, 3}
Examples of Mismatched Candidates
d7={0, 0, 1, 1, 0, 0}
d8={0, 0, 1, 1, 1, 2}

For the candidates d5 and d6, the executable statements S0 and S1 are executed in a loop with the distribution number 0, and the executable statements S2 and S3 are executed in a loop with the distribution number 1. Thus, apparently, as is the case with the pattern data x={0, 0, 1, 1, ?, ?}, when the loop with the distribution number 1 ends, the number of cache misses is equal to or greater than the maximum value MAX_MISS. Hence, the candidates d5 and d6 are loop distributions that are not worthwhile to be tested.

However, for the candidate d7, the executable statements S0, S1, S4, and S5 are executed in a loop with the distribution number 0, and the executable statements S2 and S3 are executed in a loop with the distribution number 1. Thus, the result of the candidate d7 is not necessarily the same as the result of the pattern data x={0, 0, 1, 1, ?, ?}. Similarly, for the candidate d8, the executable statements S0 and S1 are executed in a loop with the distribution number 0, and the executable statements S2, S3, and S4 are executed in a loop with the distribution number 1. Thus, the result of the candidate d8 is not necessarily the same as the result of the pattern data x={0, 0, 1, 1, ?, ?}. In other words, the number of cache misses resulting from the execution, in the same loop, of the executable statements S2, S3, and S4 in the candidate d8 is not necessarily the same as the number of cache misses resulting from the execution, in the same loop, of the executable statements S2 and S3 in the pattern data x. The candidate d8 may have less cache misses than the pattern data x.

In the process executed by the loop distribution group detection program E in FIG. 9, the maximum value MAX_MISS of the number of cache misses decreases gradually from infinity ($\infty$), which is an initial value. Thus, in the initial stage, the set A of solutions for loop distribution includes a candidate for loop distribution d with a large number of cache misses. However, since the process X23 selects the top N candidates d with fewer cache misses Md and deletes the remaining candidates, all of the candidates d with fewer cache misses are detected, and the top N candidates d with fewer cache misses Md will be eventually left in the set A.

[Process X3 Executed on the Loop Distribution Program Generation Program F]

A process will be described below in which the computer executes the loop distribution program generation program F in step X3 to generate a loop distribution program set PSET. The computer executes the program F to generate a loop distribution program set PSET of programs $P_j$ resulting from loop distribution, from the solutions $d_j$ in the set A of solutions for loop distribution detected by the loop distribution group detection program E.

Figure 10:
FIG. 10 is a diagram depicting a program $P_j$ resulting from loop distribution of the loop distribution target program P in FIG. 5 based on the loop distribution specification $d_j$ with the maximum integral value m=2.

The process of generating loop distribution programs $P_j$ from the solutions $d_j$ for loop distribution is as described below. First, the maximum integral value m included in the loop distribution specification $d_j$ is determined. The maximum integral value m means distribution into m+1 loops. Hence, when the original program P as a loop distribution target is as depicted in the example in FIG. 5, m+1 copies of the loop code 44 in FIG. 7C are prepared. For example, when m=2 in the example in FIG. 5, three loops may be prepared as depicted in FIG. 10. Then, statements indicated in the loop distribution specification $d_j$ may be copied from the loop distribution target program P and placed on lines depicting 'INSTRUCTION FOR DISTRIBUTION k' (k is an integer) in FIG. 10.

FIG. 10 is a diagram depicting a program $P_j$ resulting from loop distribution of the loop distribution target program P in FIG. 5 based on the loop distribution specification $d_j$ with the maximum integral value m=2. In the example in FIG. 10, three loops contain, in 'INSTRUCTION FOR DISTRIBUTION k', respective executable statements Si belonging to the loops.

[Loop Distribution Process for a Sample Program]

The loop distribution process according to the embodiment has been understood from the above description. Thus, the loop distribution process will be specifically described in connection with the sample program P.

FIG. 11 is a diagram depicting a sample program of the loop distribution target program P. The loop distribution target program P includes executable statements S1 to S9 in a for statement that is a distribution target loop.

(1) In the process X1 in FIG. 3, the computer executes the source code translator T to perform a source code conversion on the loop distribution target program P in FIG. 11 to generate a test program Q.

FIG. 12 is a test program Q resulting from a source code conversion of the loop distribution target program P in FIG. 11 which is performed by the computer by executing the source code translator T. That is, the computer executes the source code translator T to convert the loop distribution target program P in FIG. 10 into the test program Q in FIG. 12. The meanings of functions in the test program Q are as described with reference to FIG. 6 and FIG. 8.

Thus, as described with reference to FIG. 9, the computer executes the loop distribution group detection program E to provide the loop distribution specification d and the maximum value MAX_MISS of the number of cache misses to the test program Q in FIG. 12 and execute the test program Q. By way of example, it is assumed that the following parameter d and value MAX_MISS are provided.
d={0, 0, 0, 1, 1, 1, 2, 2, 2}
MAX_MISS=999

FIG. 13 is a diagram depicting the test program Q provided with d={0, 0, 0, 1, 1, 1, 2, 2, 2} and MAX_MISS=999. In FIG. 13, line 00 sets the value of the loop distribution specification parameter d in distribution number variables GS1 to GS9, and line 01 sets the maximum value MAX_MISS of the number of cache misses. The remaining part of the source code is the same as the corresponding part of FIG. 12.

FIG. 14 is a diagram depicting a test program Q that is substantially the same as the test program Q in FIG. 13. In FIG. 14, lines 01 to 08 correspond to a distribution loop with the distribution number 0, lines 09 to 16 correspond to a distribution loop with the distribution number 1, and lines 17 to 24 correspond to a distribution loop with the distribution number 2. Executable statements S1 to S3, executable statements S4 to S6, and executable statements S7 to S9 are embedded in the respective distribution loops.

(2) In the process X2 in FIG. 3 and FIG. 9, the computer executes loop distribution group detection program E to execute the test program Q in FIG. 14. The execution of the test program Q leads to one of the following results.

First result: when the number of cache misses is lower than the maximum value MAX_MISS, the computer outputs the number of cache misses Md and terminates the test program Q (X23 in FIG. 9).

Second result: when the number of cache misses is equal to or greater than the maximum value MAX_MISS, the computer outputs the distribution number G of a distribution loop with the number of cache misses Md having reached or exceeded the maximum MAX_MISS and terminates the test program Q (X24 in FIG. 9).

For the first result, the computer executes the program E to register loop distribution candidates d in the set A of solutions for loop distribution, and sorts the candidates in order of increasing number of cache misses to leave the top N candidates d with fewer cache misses. For the next candidate, the computer then sets the fewest cache misses to be the maximum value MAX_MISS (X23).

For the second result, the computer executes the program E to create pattern data x from the loop distribution specification d and the distribution number G and registers the pattern data x in the deletion database X (X24). For example, when the loop distribution results in the following loop distribution specification d and distribution number G:
d={0, 0, 0, 1, 1, 1, 2, 2, 2} and
G=1,
the pattern data x is as follows:
x={0, 0, 0, 1, 1, 1, ?, ?, ?}.

In this case, any number that is greater than G=1 is denoted by ? The computer deletes a loop distribution candidate matching the pattern data x from the candidates with which the test program is to be executed because the execution of the test program Q with this loop distribution candidate is known to result in the number of cache misses being equal to or greater than the maximum value MAX_MISS (X29). For example, loop distribution candidates as depicted below match the pattern data x and are to be deleted.
d={0, 0, 0, 1, 1, 1, 2, 2, 3}
d={0, 0, 0, 1, 1, 1, 2, 3, 3}
d={0, 0, 0, 1, 1, 1, 2, 3, 4}

On the other hand, loop distribution candidates as depicted below fail to match the pattern data x and are to be used to execute the test program Q.
d={0, 0, 0, 1, 1, 1, 0, 2, 2}
d={0, 0, 0, 1, 1, 1, 1, 2, 2}

As described above, loop distribution candidates are deleted for which execution of the test program Q leads to the same result as that for the pattern data x, with which the test program Q has already been executed, resulting in the number of cache misses being equal to or greater than the maximum value MAX_MISS. This prevents the process of executing the test program Q from being uselessly carried out and allows the computer to detect efficiently loop distribution candidates with fewer cache misses by executing the program E.

(3) In the process X3 in FIG. 3, the computer executes the loop distribution program generation program F to generate a set PSET of loop distribution programs $P_j$ based on the set A of solutions $d_j$ for loop distribution. For example, when the loop distribution candidate d determined for the loop distribution program P in FIG. 11 by the computer by executing the program E is:
d={0, 0, 1, 1, 1, 1, 2, 2, 2},
the computer executes the program F to generate a loop distribution program $P_j$ depicted in FIG. 15.

FIG. 15 is a diagram depicting an example of the loop distribution program $P_j$. The example is the program $P_j$ resulting from loop distribution based on d={0, 0, 1, 1, 1, 1, 2, 2, 2}. The program $P_j$ is loop-distributed into loops of statements S1 and S2, statements S3 to S6, and statements S7 to S9.

(4) In the process X4 in FIG. 3, the computer uses the optimization compiler to sequentially compile N loop distribution programs $P_j$ in the set PSET, evaluates the execution time, and detects a loop distribution program with the highest speed. In the process X4, a plurality of results can be obtained from one loop distribution program $P_j$ by utilizing a plurality of optimization strategies of the optimization compiler. Then, the program with the highest speed is detected in the plurality of results to allow a high-speed loop distribution program to be detected.

Fewer cache misses are ensured for the N loop distribution programs $P_j$ in the set PSET. Thus, high-performance programs unobtainable by merely implementing the optimization process of the optimization compiler may be detected by applying discrete optimizations to the respective loops based on the loop distribution programs $P_j$.

[Variation 1: Process of Narrowing down Loop Distribution Candidates]

The set of loop distribution specifications d with the meaning of the program unchanged generally tends to have an enormous size. Thus, narrowing down loop distribution candidates as described below is desirable.

A first narrowing-down method is as follows. When a loop is distributed, distribution into loops with fewer executable statements Si therein is generally not desirable because an overhead of a rotation process for the loops has increased. Furthermore, an excessively large number of statements Si in the loop are generally not preferable because the statements cause an increase in the number of cache misses. Thus, in the first narrowing-down method, the following are deleted from the group of loop distribution candidates: a loop distribution candidate with the number of executable statements Si in the loop equal to or lower than the minimum value $n_{min}$; and a loop distribution candidate with the number of executable statements Si in the loop equal to or greater than the maximum value $n_{max}$. This deletion process is preferably executed during the process X27 in FIG. 9.

A second narrowing-down method is as follows. In the process X21 in FIG. 9, the initial value of the maximum value MAX_MISS of the number of cache misses is set to infinity. However, when the number of candidates for loop distribution is enormous, the initial value of the maximum value MAX_MISS is set to any value u less than infinity so that the candidates d and the numbers of cache misses Md used when the process X22 results in the number of cache misses being greater than the maximum value MAX_MISS are excluded from the set A of solutions for loop distribution. When the number of loop distribution candidates that can be achieved with the number of cache misses lower than the initial value u is low or zero, the process in FIG. 9 is executed again with initial value u increased. Appropriate setting of the initial value u enables the loop distribution candidates to be appropriately narrowed down to allow the loop distribution programs $P_j$ to be more efficiently detected.

[Variation 2: Additional Process for Temporary Array of a Variable]

When a distribution target loop in a distribution target program includes a scalar variable, a process is needed which involves delivering a variable in a first distribution loop to another one—second distribution loop—as a result of loop distribution. Such a process is enabled by adding a process of defining the variable in the first distribution loop and then writing the variable into a temporary array and a process of reading the temporary array into the variable in the second distribution loop. Thus, the computer executes the source code and the translator T to carry out a process of adding a write statement and a read statement for the temporary array to the scalar variable.

Figure 16:
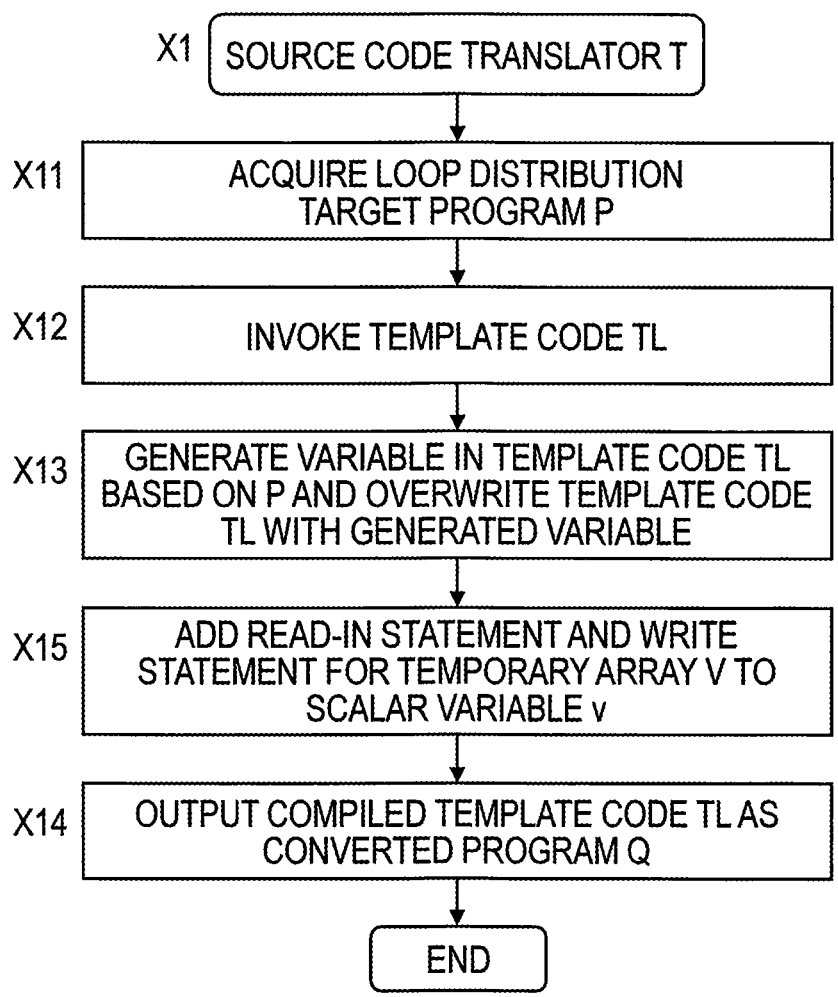
FIG. 16 is a flowchart of a process executed by the source code translator T according to Variation 2.
Figure 17:
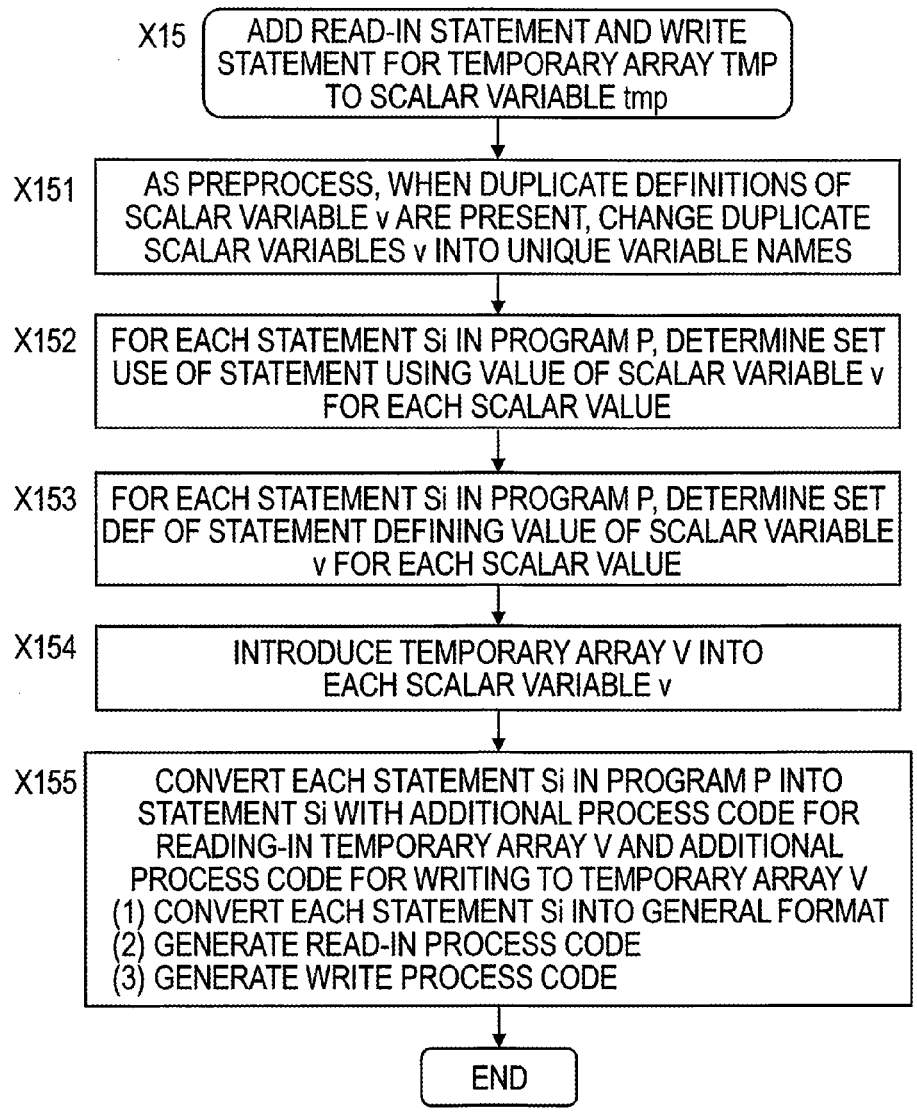
FIG. 17 is a flowchart of the process X15 in FIG. 16.
Figure 19:
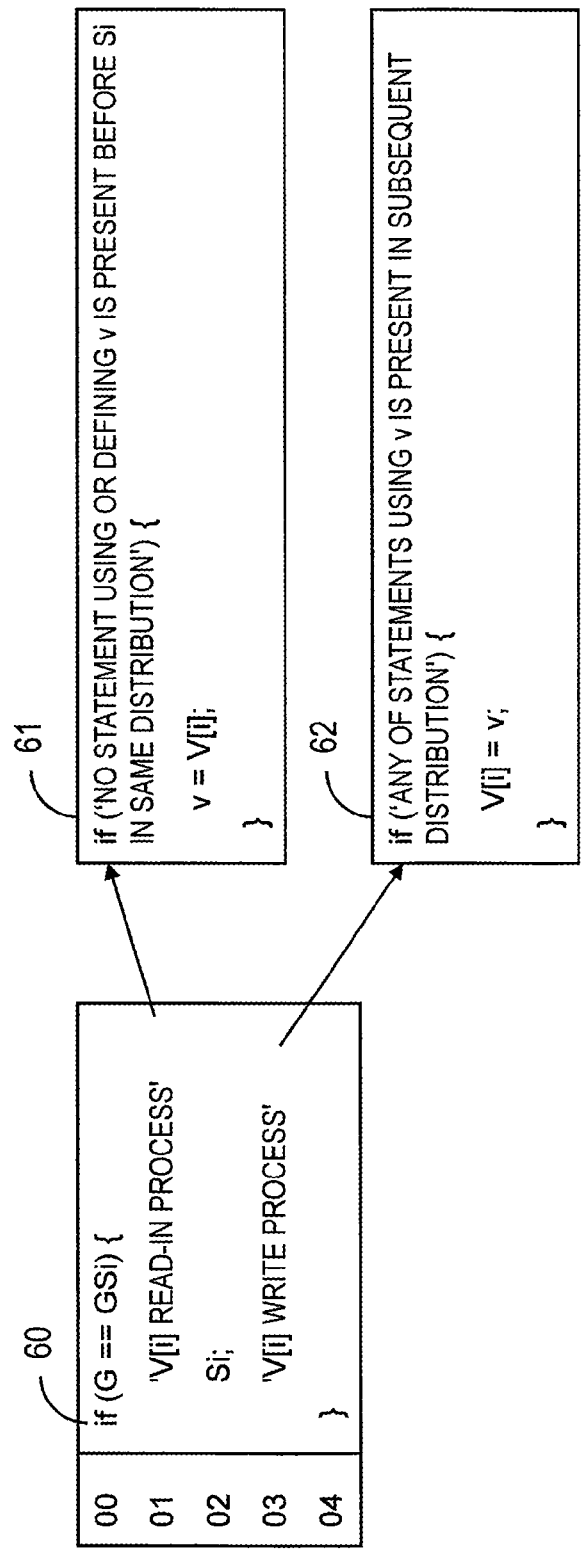
FIG. 19 is a diagram depicting an example of a program adding a read process and a write process for a temporary array according to Variation 2.

FIG. 16 is a flowchart of a process executed by the source code translator T according to Variation 2. Furthermore, FIG. 17 is a flowchart of the process X15 in FIG. 16. FIG. 18 is a diagram illustrating Variation 2. FIG. 19 is a diagram depicting an example of a program adding a read process and a write process for a temporary array according to Variation 2. FIG. 20 and FIG. 21 are diagrams depicting an example of a test program with a temporary array added thereto.

In a loop distribution target program 51 in FIG. 18, a variable tmp is defined in an executable statement S1 as follows.

S1: tmp=A[i]+B[i]

Then, the variable tmp is utilized in executable statements S2 and S3 as follows.

S2: C[i]=tmp*D[i]
S3: E[i]=tmp−C[i]

Thus, when the loop is distributed such that, for example, the executable statement S1 has the loop number 0 and that the executable statements S2 and S3 have the loop numbers 1 and 2, the following need to be executed: a process of temporarily writing, for the loop number 0, the variable tmp defined in the executable statement S1 into a temporary array after the executable statement S1 and a process of reading, for the loop numbers 1 and 2, the temporary array into the variable tmp before the executable statements S2 and S3.

The flowchart of the process executed by the source code translator T according to Variation 2 depicted in FIG. 16 corresponds to the flowchart in FIG. 4 to which a process X15 is added. The processes other than the process X15, that is, the processes X11 to X14, are the same as the processes X11 to X14 in FIG. 4. In the process X15, the computer adds a read statement and a write statement for a temporary array V for a scalar variable v to the executable statement Si. However, whether or not the addition is needed is determined using an algorithm described below.

FIG. 17 is a flowchart of the process X15. When duplicate definitions of the scalar variable v are present, the computer converts, as a preprocess, the duplicate scalar variables v into unique variable names (X151). For example, the variable name tmp may be used in a duplicate manner as in a program 52 in FIG. 18. In other words, the executable statement S1 defines the variable tmp, and the executable statements S2 and S3 utilize the variable tmp. Moreover, the executable statement S4 uses the variable tmp to define a new variable tmp, and the executable statement S5 utilizes the new variable tmp. Thus, it should be understood that the variable tmp in the executable statements S1 to S3 is different from the variable tmp in the executable statements S4 and S5.

In this case, the duplicate but different variables tmp need to be converted into unique variable names. A program 53 is an example in which the two variables tmp in the program 52 are converted into tmp1 and tmp2.

Then, in the process X15, the computer works out, for each scalar variable, a set USE of executable statements Si using the value of the scalar variable v, with respect to the statements Si in the loop distribution target program P (X152). The executable statements using the value of the scalar variable v have the scalar variable v positioned on the right side.

Then, in the process X15, the computer determines whether each of the statements Si in the loop distribution target program P defines the value of the scalar variable v to obtain a set DEF of executable statements Si defining the value of the scalar variable v for each scalar variable (X153). The executable statements defining the value of the scalar variable v have the scalar variable v positioned on the left side.

In the example of the loop distribution target program P in FIG. 18, the set USE and a set DEF are as follows.
USE={S2, S3}
DEF={S1}

Then, in the process X15, the computer introduces the temporary array V into each scalar variable v. The temporary array V is a array of variables in which, when a loop is repeatedly executed, scalar variables v generated in the respective loops i are arranged. When the loop is repeated three times, scalar variables v1, v2, and v3 generated in the three loops are as follows.
v1=V[1]
v2=V[2]
v3=V[3]

Then, in the process X15, the computer converts each of the executable statements Si in the loop distribution target loop in the loop distribution target program P into code having process code for reading-in of the temporary array V, the executable statement Si, and process code for writing of the temporary array V (X155). The process X155 is specifically as described below.

(1) In the process X155, the computer converts each of the executable statements Si into code in a general format. FIG. 19 depicts code 60 in a general format. That is, the code 60 in the general format is code obtained by prepending the process code for reading-in of the temporary array V[i] ('V[i] READ-IN PROCESS') to the executable statement Si in the code 42 in FIG. 7C and appending the process code for writing of the temporary array V[i] ('V[i] WRITE PROCESS') to the executable statement Si.

(2) In the process X155, the computer creates code for the 'V[i] READ-IN PROCESS' portion. (a) If the statement Si does not use the variable v, the computer sets no code in this portion. In other words, since the statement Si does not use the variable v, the temporary array V[i] need not preliminarily be read into the variable v (v=V[i]). Moreover, (b) if the statement Si uses the variable v, the computer creates code 61 depicted in FIG. 19.

The code 61 in FIG. 19 executes the read-in statement v=V[i]; when the condition in the if statement is established, that is, when "no statement using the variable v is present before the statement Si in the same distribution loop and no statement defining v is present before the statement Si in the same distribution loop". The computer creates code corresponding to the condition in the if statement with reference to the set USE of statements using the variable v and the set DEF of statements defining the variable v. In other words, the condition in the if statement is that a statement with lower number than the executable statements Si present in the set USE does not exist in a distribution loop GSi that is the same as the executable statement Si in the code 60 in FIG. 19 and that a statement with lower number than the executable statements Si present in the set DEF does not exist in the distribution loop GSi.

For example, when, for the variable v used for the executable statement S3, the statements S2, S4, and S5 are present in the set USE and the statement S1 is present in the set DEF, the computer creates, as code corresponding to the above-described condition, code depicted below and indicating that "a distribution loop GS2 with a statement S2 is not equal to a distribution loop GS3 with a statement S3 (GS2 and GS3 are not in the same distribution loop) and that a distribution loop GS1 with the statement S1 is not equal to the distribution loop GS3 with the statement S3 (GS1 and GS3 are not in the same distribution loop)".
GS3 !=GS1 && GS3 !=GS2

In this case, "not equal" is denoted by !=, and "AND" is denoted by &&.

In other words, when "the distribution loop GS2 with the statement S2 is not equal to the distribution loop GS3 with the statement S3 and the distribution loop GS1 with the statement S1 is not equal to the distribution loop GS3 with the statement S3", no process of using or defining the variable v is present before the statement S3 in the distribution loop to which the statement S3 belongs. Thus, a process is needed which involves reading in the variable v immediately before the statement S3. When, in the distribution loop to which the statement S3 belongs, a process of using the variable v is present before the statement S3, a process is already added which involves reading in the variable v immediately before the process of using the variable v, whereby the statement S3 can use the variable v without reading the variable v immediately before S3. Furthermore, when, in the distribution loop to which the statement S3 belongs, the process of defining the variable v is already present before the statement S3, also the statement S3 can use the variable v.

(3) In the process X155, the computer creates code for the 'V[i] WRITE PROCESS' portion. (a) If the statement Si does not define the variable v, the computer sets no code in this portion. In other words, since the statement Si does not define the variable v, the variable v need not be written into the temporary array V[i] (V[i]=v) immediately after the statement Si. Moreover, (b) if the statement Si defines the variable v, the computer creates code 62 depicted in FIG. 19.

The code 62 in FIG. 19 executes the write statement V[i]=v; when the condition in the if statement is established, that is, when "any of the statements using the variable v after the statement Si is present in a succeeding distribution loop". The computer creates code corresponding to the condition in the if statement with reference to the set USE of statements using the variable v. In other words, the condition in the if statement is that a distribution loop, succeeding the distribution loop GSi with the executable statement Si in the code 60 in FIG. 19, contains a statement having a greater number than the executable statements Si present in the set USE.

For example, when, for the definition of the variable v in statement S3, the statements S4 and S5 are present in the set USE, the computer creates, as code corresponding to the above-described condition, code depicted below and indicating that "a distribution loop GS3 with a statement S3 is not equal to a distribution loop GS4 with a statement S4 and that the distribution loop GS3 with the statement S3 is not equal to a distribution loop GS5 with a statement S5".
GS3 !=GS4||GS3 !=GS5

In this case, "not equal" is denoted by !=, and "OR" is denoted by ||.

In other words, when "the distribution loop GS3 with the statement S3 is not equal to the distribution loop GS4 with the statement S4 or the distribution loop GS3 with the statement S3 is not equal to the distribution loop GS5 with the statement S5", the statement S4 or S5 uses the variable v in the distribution loop GS4 or GS5 succeeding the distribution loop GS3 with the statement S3. Thus, a process of writing the variable v is needed in the distribution loop GS3 with the statement S3.

After a process in which the translator T generates a test program Q, in a process of executing the test program Q with the loop distribution specification parameter d varied, the order of the executable statements Si may be reversed. Thus, statements executed before and after the statement Si do not necessarily depend on the number of the statement. However, data dependence analysis (X28 in FIG. 9) ensures that a statement using the variable v is present only after a statement defining the variable. Thus, the processes (2) and (3) in the process X155 need not take into account whether a statement is executed before or after the statement Si. However, it is true regardless of the loop distribution specification parameter d that, in the same distribution loop, a statement executed before the statement Si has a lower number than the statement Si, whereas a statement executed after the statement Si has a greater number than the statement Si.

Now, a test program Q' resulting from a source code conversion will be described taking the code 51 in the distribution target loop in FIG. 18. FIG. 20 depicts the test program Q' resulting from the source code conversion.

In the example of the code 51, the sets USE and DEF are as follows.
USE={S2,S3}
DEF={S1}

Thus, in the test program Q' in FIG. 20, code in the statement S1 in lines 05 to 10 includes additional code (lines 07 to 09) for a process of writing the variable tmp into the temporary array TMP[i], TMP[i]=tmp; (line 08) when the distribution loop GS1 with the statement S1 is not equal to one of the distribution loops GS2 and GS3 with the statements S2 and S3 (line 07).

Moreover, in the test program Q' in FIG. 20, code in the statement S2 in lines 11 to 16 includes additional code (lines 12 to 14) for a process of reading the temporary array TMP[i] into the variable tmp, tmp=TMP[i]; (line 13) when the distribution loop GS2 with the statement S2 is not equal to the distribution loops GS1 with the statements S1 defining the variable v (line 12).

Furthermore, in the test program Q' in FIG. 20, code in the statement S3 in lines 17 to 23 includes additional code (lines 18 to 20) for a process of reading the temporary array TMP[i] into the variable tmp, tmp=TMP[i]; (line 19) when the distribution loop GS3 with the statement S3 is not equal to the distribution loops GS1 with the statements S1 defining the variable v and to the distribution loop GS2 with the statement S2 using the variable v (line 18).

FIG. 21 is a diagram depicting the test program Q' in FIG. 20 provided with loop distribution specification parameters d10 and d11. For d10={0,0,1}, the statements S1 and S2 are present in the same distribution loop, and the statement S3 is present in a different distribution loop. The test program Q' includes an additional process of writing the variable tmp into the temporary array TMP[i] after the statement S1, TMP[i]=tmp; (line 02) and an additional process of reading the temporary array TMP[i] into the variable tmp before the statement S3, tmp=TMP[i]; (line 06).

On the other hand, for d11={0, 1, 1}, the statement S1 is present in a different distribution loop, and the statements S2 and S3 are present in the same distribution loop. The test program Q' includes an additional process of writing the variable tmp into the temporary array TMP[i] after the statement S1, TMP[i]=tmp; (line 02) and an additional process of reading the temporary array TMP[i] into the variable tmp before the statement S2, tmp=TMP[i]; (line 05).

As described above, creation of the test program Q' in FIG. 20 allows the test program Q' executed by the loop distribution group detection program E to be automatically generated based on the loop distribution specification parameter d.

As described above, the embodiment first determines the set of solutions for loop distribution with lower number of cache misses and then evaluates the execution time of each solution optimized by the compiler. This allows a loop distribution program with the minimum execution time to be more efficiently detected.

Furthermore, according to the embodiment, during a process of determining the set of solutions for loop distribution with lower number of cache misses, loop distribution candidates for which the number of cache misses is unlikely to decrease are deleted from the loop distribution candidates executed in order to measure the number of cache misses, based on the distribution pattern with the number of cache misses equal to or greater than the reference value. This reduces the execution of useless candidates, allowing loop distribution candidate with fewer cache misses to be efficiently narrowed down.

Moreover, according to the embodiment, the number of cache misses can be measured for all the loop distribution candidates by executing object code compiling the test program Q, with the loop distribution specification parameter d varied. Thus, the test program Q only needs to be complied once, allowing loop distribution candidate with fewer cache misses to be efficiently narrowed down.

Furthermore, according to the embodiment, even when the loop distribution utilizes the temporary array, the test program Q' with the effects of the temporary array taken into account is generated. This allows loop distribution candidate with fewer cache misses to be appropriately narrowed down.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. Non-transitory computer readable storage medium which stores therein a loop distribution group detection program for causing a computer to execute a process comprising:
    converting a loop distribution target program into a test program having a cache miss measurement instruction to measure a number of cache misses, by dividing a loop in the loop distribution target program into a plurality of distribution loops based on a loop distribution specification parameter;
    sequentially executing the test program while varying the loop distribution specification parameter, extracting loop distribution candidates, for which the number of cache misses measured in accordance with the cache miss measurement instruction exceeds a reference value, as a first loop distribution candidate group, and extracting loop distribution candidates, for which the number of cache misses does not exceed the reference value, as a second loop distribution candidate group; and
    excluding loop distributions with the number of cache misses exceeding the reference value from execution target candidates for the test program, by comparing a loop distribution based on the loop distribution specification parameter with loop distributions of the loop distribution candidates in the first loop distribution candidate group.

2. The non-transitory computer readable storage medium according to claim 1, wherein the process further comprises:

selecting a desired number of candidates from the loop distribution candidates in the second loop distribution candidate group in order of increasing number of cache misses; and updating the reference value to a maximum number of cache misses among the selected loop distribution candidates.

3. The non-transitory computer readable storage medium according to claim 1, wherein the extracting comprises registering in the first loop distribution candidate group a distribution number of a distribution loop with the number of cache misses exceeding the reference value and the loop distribution, and the excluding comprises determining the loop distribution to be a loop distribution with the number of cache misses exceeding the reference value when the loop distribution based on the loop distribution specification parameter matches a loop distribution in the first loop distribution candidate group in terms of a combination of distribution numbers from a first distribution number to a distribution number of a distribution loop with the number of cache misses exceeding the reference value.

4. The non-transitory computer readable storage medium according to claim 1, wherein the process further comprises:

excluding the loop distribution candidate based on the loop distribution specification parameter when a number of instruction statements in distribution loops resulting from distribution based on the loop distribution specification parameter is lower than a first number of instruction statements, or greater than a second number of instruction statements greater than the first number of instruction statements.

5. The non-transitory computer readable storage medium according to claim 1, wherein the converting comprises prepending a variable read-in statement, which reads in a temporary array with respect to a variable, to an instruction statement using the variable in the loop distribution target program, and appending a variable write statement that writes the variable into the temporary array to an instruction statement defining the variable.

6. The non-transitory computer readable storage medium according to claim 5, wherein the prepending the variable read-in statement is performed when no other instruction statement using or defining the variable is present before the instruction statement using the variable in a distribution loop to which the instruction statement using the variable belongs, and the appending the variable write statement is performed when an instruction statement using the variable is present in a distribution loop succeeding a distribution loop to which the instruction statement defining the variable belongs.

7. A loop distribution detection method of causing a processor to execute a process comprising:

converting a loop distribution target program into a test program having a cache miss measurement instruction to measure the number of cache misses, by dividing a loop in the loop distribution target program into a plurality of distribution loops based on a loop distribution specification parameter and;

sequentially executing the test program while varying the loop distribution specification parameter, extracting loop distribution candidates for which the number of cache misses measured in accordance with the cache miss measurement instruction exceeds a reference value, as a first loop distribution candidate group, and extracting loop distribution candidates for which the number of cache misses does not exceed the reference value, as a second loop distribution candidate group; and excluding loop distributions with the number of cache misses exceeding the reference value from execution target candidates for the test program, by comparing a loop distribution based on the loop distribution specification parameter with loop distributions of the loop distribution candidates in the first loop distribution candidate group.

8. The loop distribution detection method according to claim 7, wherein the process further comprises:

selecting a desired number of candidates from the loop distribution candidates in the second loop distribution candidate group in order of increasing number of cache misses; and updating the reference value to a maximum number of cache misses among the selected loop distribution candidates.

9. The loop distribution detection method according to claim 7, wherein the extracting comprises registering in the first loop distribution candidate group a distribution number of a distribution loop with the number of cache misses exceeding the reference value and the loop distribution, and the excluding comprises determining the loop distribution to be a loop distribution with the number of cache misses exceeding the reference value when the loop distribution based on the loop distribution specification parameter matches a loop distribution in the first loop distribution candidate group in terms of a combination of distribution numbers from a first distribution number to a distribution number of a distribution loop with the number of cache misses exceeding the reference value.

* * * * *